(12) United States Patent
Sanghera et al.

(10) Patent No.: US 9,507,090 B2
(45) Date of Patent: Nov. 29, 2016

(54) PHASE AND AMPLITUDE CONTROL FOR OPTICAL FIBER OUTPUT

(71) Applicants: Jasbinder S. Sanghera, Ashburn, VA (US); Catalin M. Florea, Washington, DC (US); Rafael R. Gattass, Washington, DC (US); Ishwar D. Aggarwal, Charlotte, NC (US)

(72) Inventors: Jasbinder S. Sanghera, Ashburn, VA (US); Catalin M. Florea, Washington, DC (US); Rafael R. Gattass, Washington, DC (US); Ishwar D. Aggarwal, Charlotte, NC (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 127 days.

(21) Appl. No.: 14/210,480

(22) Filed: Mar. 14, 2014

(65) Prior Publication Data
US 2015/0253504 A1    Sep. 10, 2015

Related U.S. Application Data

(60) Provisional application No. 61/786,656, filed on Mar. 15, 2013.

(51) Int. Cl.
*G02B 6/26* (2006.01)
*G02B 1/00* (2006.01)

(52) U.S. Cl.
CPC ............... *G02B 6/262* (2013.01); *G02B 1/005* (2013.01)

(58) Field of Classification Search
USPC .......................................................... 385/27
See application file for complete search history.

(56) References Cited

U.S. PATENT DOCUMENTS

| 8,031,414 B1* | 10/2011 | Liu | G02B 27/0927 359/641 |
|---|---|---|---|
| 2010/0253949 A1* | 10/2010 | Adler | A61B 5/0066 356/479 |
| 2011/0033156 A1* | 2/2011 | Sanghera | B29D 11/00682 385/76 |
| 2014/0064654 A1* | 3/2014 | Anand | G02F 1/0115 385/3 |

* cited by examiner

*Primary Examiner* — Shamim Ahmed
(74) *Attorney, Agent, or Firm* — Naval Research Laboratory

(57) ABSTRACT

A method for shaping an output light beam from an optical fiber by controlling the phase and amplitude of the beam by producing beam shaping elements on an exit facet of the optical fiber by direct surface texturing of the exit facet, where a controlled phase difference is achieved across the fiber cross-section over a predefined pattern. The optical fiber can be a single mode fiber or a multi-mode fiber. Either a binary or a complex phase difference can be achieved. Also disclosed is the related system for shaping an output light beam from an optical fiber.

16 Claims, 6 Drawing Sheets

PHASE AND AMPLITUDE CONTROL FOR OPTICAL FIBER OUTPUT

PRIORITY CLAIM

The present application is a non-provisional application claiming the benefit of U.S. Provisional Application No. 61/786,656, filed on Mar. 15, 2013 by Jasbinder S. Sanghera et al., entitled "Phase and Amplitude Control for Optical Fiber Output," the entire contents of which is incorporated herein by reference.

BACKGROUND OF THE INVENTION

Field of the Invention

The present invention relates generally to optical fiber outputs and, more specifically, to controlling the phase and amplitude of a light beam profile exiting an optical fiber.

Description of the Prior Art

A typical optical system will transmit, reflect, refract or otherwise modify the propagation of light or its salient properties such as phase, amplitude or polarization. In particular, an optical fiber will present at the cross-section of the output aperture a beam of light characterized by a certain amplitude (intensity) and phase distribution. The very familiar situation is that of the light propagation through a single-mode fiber which will have at the output a profile close to that of a Gaussian beam. The intensity is highest at the center and then it decreases as radius increases. The Gaussian beams are important because they maintain a Gaussian intensity profile at any location along the beam axis, even after passing through lenses (ignoring lens aberrations). The phase profile of such a beam is also very simple, usually linear or quadratic (described by a polynomial). The quadratic case is important as it is implying convergence or divergence of the beam (change in the beam radius).

There are however many situations when a Gaussian beam is not desirable. Particle trapping and ultra high-resolution fluorescence microscopy are achieved using beams that have a ring or doughnut shape (no light in the center). Flat top beams, where the intensity is constant over most of the cross-section, are also of interest when uniform illumination and efficient focusing are required such as in material laser processing. Most of the work is done in bulk, with light beams manipulated by macro optics (gratings, phase plates etc.).

Beam shaping can be implemented through different techniques: use of apertures, use of a combination of various optical elements, such as micro-lens arrays, or through manipulation of the near field which results in the desired changes in the far field. This last method, requiring modification in the near field of the beam phase rather than amplitude, is easy to implement. It can be achieved by placing a phase mask in the beam path. It also provides the desired profile with minimal loss in total energy. In very few cases direct beam manipulation was performed at the output of an optical fiber.

Beam shaping has been researched intensively and a variety of patents have provided a multitude of approaches. For example, U.S. Pat. No. 8,031,414 (2011), U.S. Pat. No. 8,016,449 (2011), and U.S. Pat. No. 7,593,615 (2010) provide for instructive reading with respect to various means of beam shaping (all covering refractive methods using external lenses, diffusers, waveguides or other optical elements). Prior art discussing the idea of creating a phase mask-like structure directly on the fiber end is extremely limited. Existing approaches require deposition of photosensitive material on the fiber end, material in which the surface structure is to be created.

BRIEF SUMMARY OF THE INVENTION

The aforementioned problems are overcome in the present invention which provides a method for shaping an output light beam from an optical fiber by controlling the phase and amplitude of the beam by producing beam shaping elements on an exit facet of the optical fiber by direct surface texturing of the exit facet, where a controlled phase difference is achieved across the fiber cross-section over a predefined pattern. The optical fiber can be a single mode fiber or a multi-mode fiber. Either a binary or a complex phase difference can be achieved. Also disclosed is the related system for shaping an output light beam from an optical fiber.

The present invention provides a method of controlling the amplitude and phase of the output beam from an optical fiber. The purpose of this invention is to shape the output beam from an optical fiber in terms of phase and amplitude using surface relief structures integrated directly into the fiber facet. Direct modification of the fiber end allows for control of amplitude, phase and direction of the light beam profile exiting the optical fiber with direct implications in laser processing, optical trapping, super high-resolution fluorescence microscopy, optical switching etc.

The present invention allows for optical performance across a very broad wavelength range and across a wide range of materials. It provides for a cheap implementation requiring, for example, a single master with the negative of the structure of interest. That master can then be used to create the desired surface structure in multiple fibers without loss of quality from one fiber to another. The direct alternative technique to the method of the present invention is the use of external phase masks. However, these add to the complexity and the cost of the technique while reducing the ruggedness.

These and other features and advantages of the invention, as well as the invention itself, will become better understood by reference to the following detailed description, appended claims, and accompanying drawings.

DETAILED DESCRIPTION OF THE INVENTION

The present invention provides a novel method and system for beam shaping through the modification of the near field directly at the exit facet of the optical fiber. This is achieved through direct surface texturing of the fiber facet, which allows for controlled phase change across the beam diameter. This approach is very different from other methods because it does not require an extraneous material to be attached or deposited to the fiber end, which makes the present approach more robust and simpler to implement.

This type of surface texturing requires in certain situations nanometer-level control of the fiber facet structures, as will be made clear in the examples. The phase change will provide the required near field transformation without the need of external phase plates, thereby reducing system complexity and enhancing ruggedness. The surface texturing can be performed by stamping the fiber end onto typical substrates such as silicon wafers or fused silica plates which have the appropriate patterns built in. US Patent Publication 20110033156 (2010) discloses a technique for surface microstructuring of optical fiber ends with intent of reducing the reflection loss occurring at the fiber-air interface.

In one embodiment, the facet of a single-mode chalcogenide, fluoride, silica, silicate, germanate, tellurite or any other optical fiber is modified such that a certain binary phase difference can be achieved in a controlled manner across the fiber cross-section over a predefined pattern.

EXAMPLE 1

A single-mode fiber end-surface is modified with a circular step of depth d in the core region. The width of the step should match a certain portion of the diameter of the output beam. The depth of the step is determined by the desired phase change and the operating wavelength $\lambda$.

Figure 1:
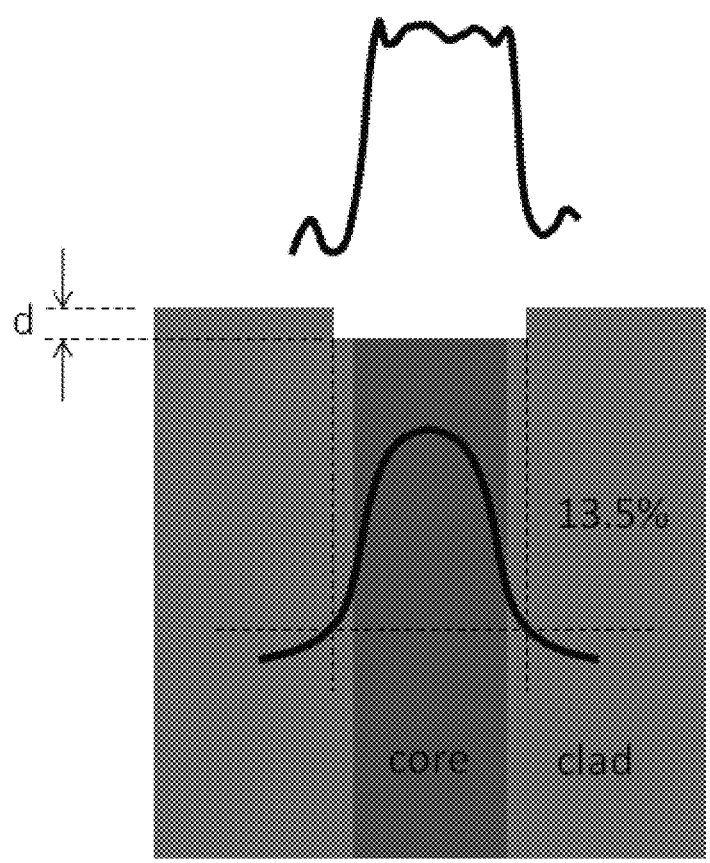
FIG. 1 shows a π phase change created over the central portion of the beam up to the 1.e-2 intensity boundary. Output field intensity shown is after Fourier transform.

For single-mode fibers we require a $\pi$ phase change in the central portion of the beam, up to the $1.e^{-2}$ (13.5%) diameter of the beam, with respect to the remaining beam. The output beam is converted to a sinc function whose Fourier transform (as given by lens or in the far field) is a flat top profile. The situation is illustrated in FIG. 1.

For this case, the required depth (d) of the surface relief is given by Equation (1), where n is the effective refractive index of the mode:

$$d = \frac{\lambda}{2(n-1)} \quad (1)$$

In particular, consider a typical single-mode $As_2S_3$ fiber with a $1.e^{-2}$ diameter of about 6 µm and a cladding size of 170 µm. The effective index of the fundamental mode is n=2.404 as determined from fiber Bragg gratings data (Florea et al., "Fiber Bragg gratings in $As_2S_3$ fibers obtained using a 0/−1 phase mask," Opt. Mat., 31, 942-944 (2009), the entire contents of which is incorporated herein by reference). For operation at $\lambda$=1.55 µm, one needs a surface relief depth d=552 nm. Other chalcogenides can also be considered, such as $As_2Se_3$, with the operating wavelength changed to accommodate the transmission window of the material.

EXAMPLE 2

Figure 2:
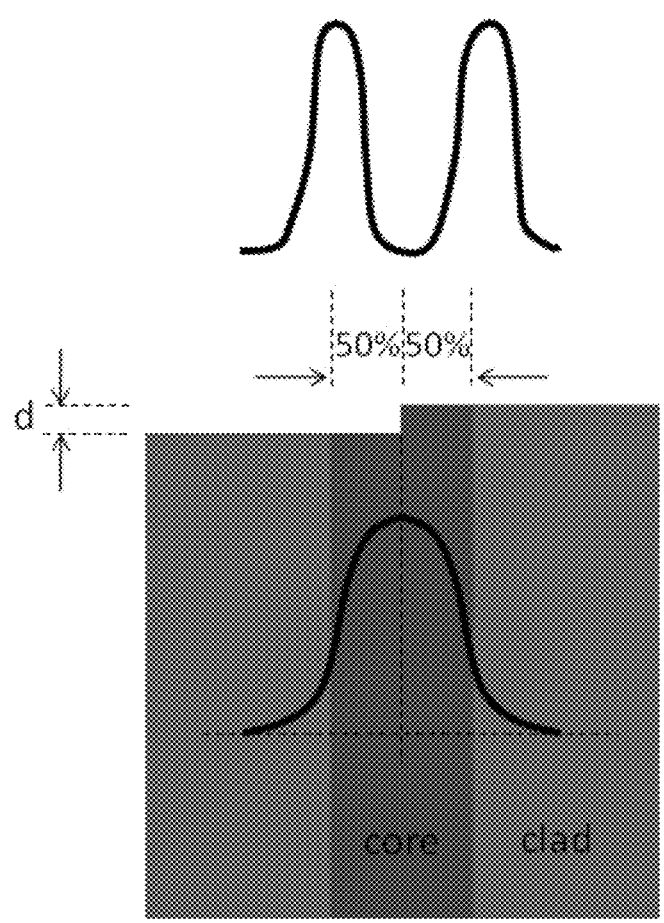
FIG. 2 shows a π phase change created across 50% of the beam. Output field intensity shown is after Fourier transform.

Another particular case is that of a modified fiber end-surface where half of the beam output aperture experiences a $\pi$ phase shift with respect to the other half, as illustrated in FIG. 2. The depth of the step on the fiber surface is given by Equation (1) as well.

In another embodiment, the facet of a single-mode chalcogenide, fluoride, silica, silicate, germanate, tellurite or any other optical fiber is modified such that a certain complex (non binary) phase difference can be achieved in a controlled manner across the fiber cross-section over a predefined pattern.

EXAMPLE 3

Figure 3:
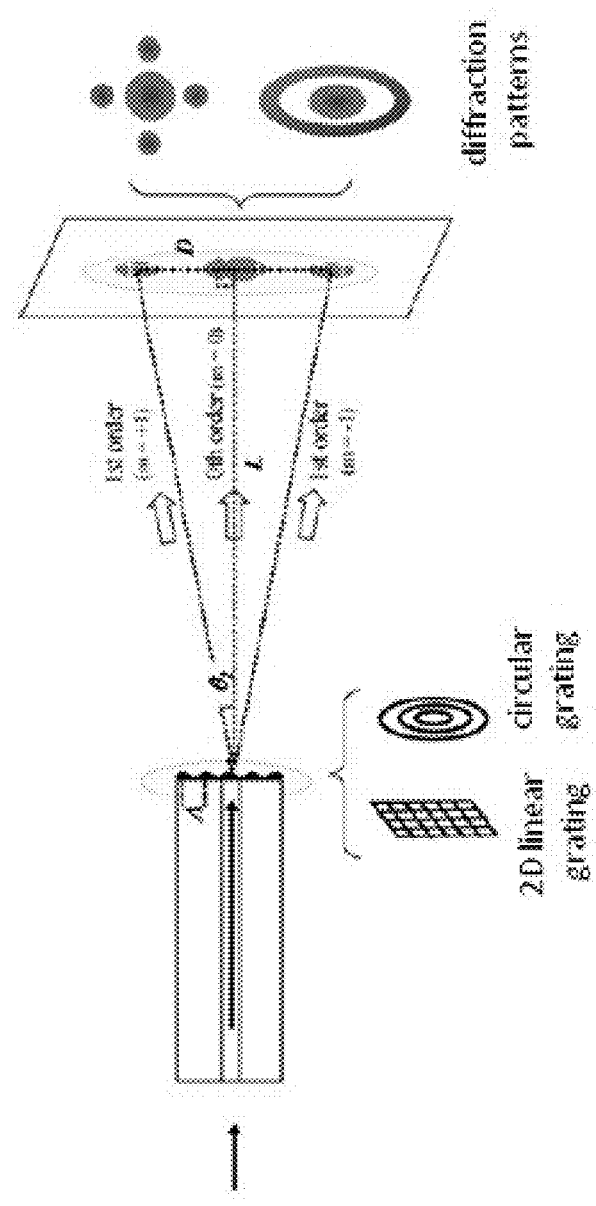
FIG. 3 shows that two types of gratings (2D linear and circular) on the fiber end facet will yield different light output profiles.
Figure 3:
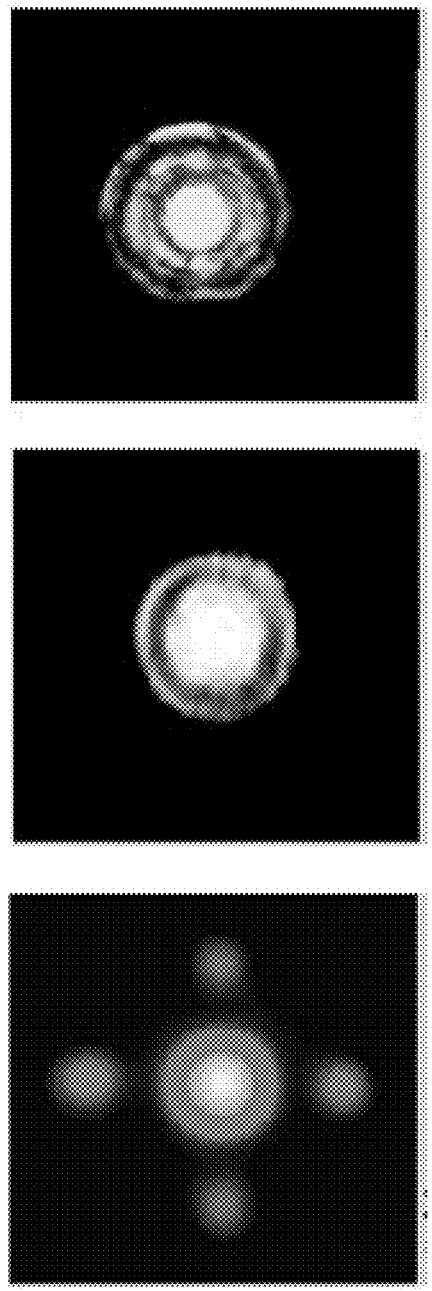
Figure 4:
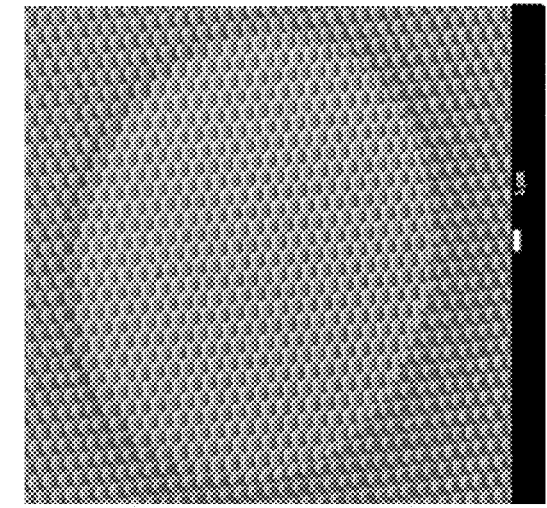
FIG. 4 shows a 2D linear grating stamped on the end face of a 22 μm core fiber of a low mode count $As_2S_3$ fiber (6 modes at wavelength of 4.8 μm).
Figure 4:
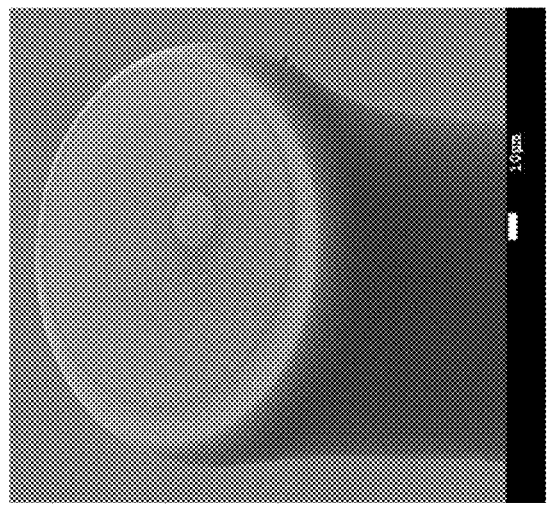

A single-mode fiber end-surface is modified with a grating of period L in the core region (FIG. 3). A variety of gratings (circular, blazed etc.) are possible. The type, period and depth of the grating should be adjusted to provide the desired diffraction for the light beam exiting the fiber. A variety of gratings and situations can be considered such as to manipulate the amplitude and direction of the resulting output beams. FIG. 4 shows a 2D linear grating stamped on the end face of a 22 µm core fiber of a low mode count $As_2S_3$ fiber (6 modes at wavelength of 4.8 µm).

EXAMPLE 4

Figure 5:
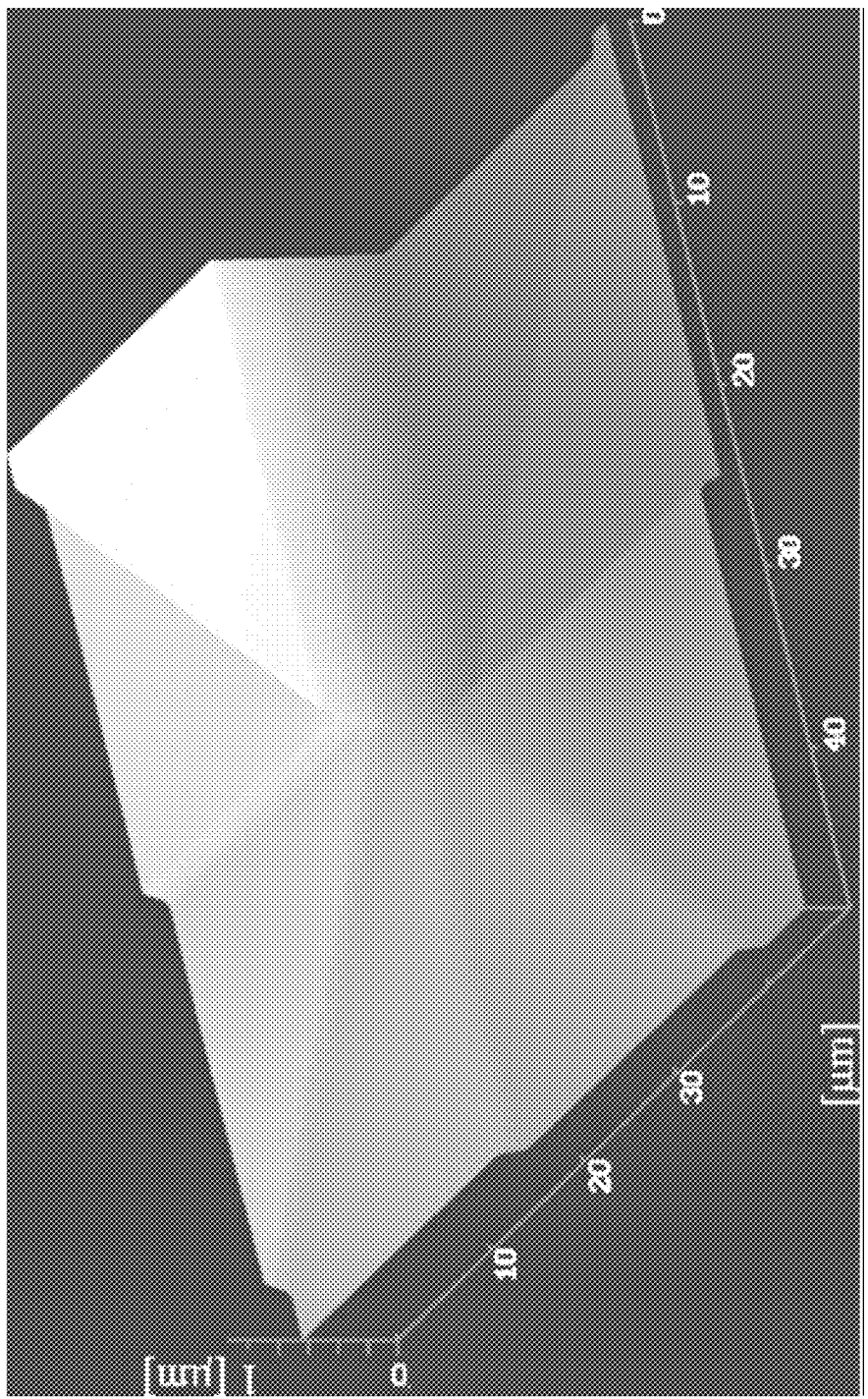
FIG. 5 is an illustration of a surface structure that creates a 2π phase change along the cross-section of the fiber end in a total of 8 steps.

A $2\pi$ phase change is achieved by a finite number of steps created in a spiral pattern across the fiber end facet, around the center of the cross-section. This surface structure will create an output beam in the shape of a ring or doughnut, with no light in the center. The situation where the $2\pi$ phase change is created by a total of 8 steps is illustrated in FIG. 5.

The thickness of each step is easily calculated from the requirement that the phase change occurring at each step be exactly $2\pi/8$ and it is given by Equation (2):

$$d = \frac{\lambda}{8(n-1)} \quad (2)$$

In the case of a typical single-mode $As_2S_3$ fiber with an effective index of the fundamental mode of n=2.404 and for operation at $\lambda$=1.55 µm one needs a step thickness d=138 nm. The control of the thickness is important but easily implemented given the advanced state of art of the fabrication techniques involved.

Figure 6:
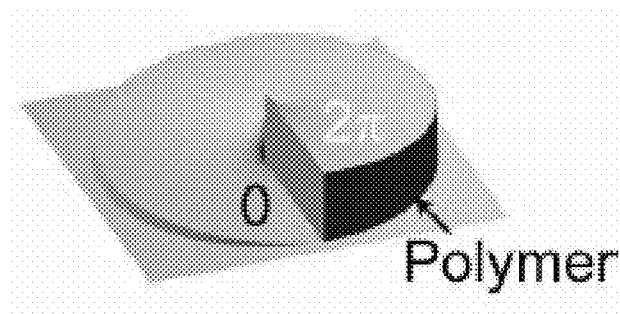
FIG. 6 is an example of a commercially-available substrate with a surface structure that creates a 2π phase change along the cross-section of a laser beam.

An extension of Example 4 is that of a spiral that has a very large number of steps or that achieves the $2\pi$ phase change in a continuous fashion rather than step-wise fashion. This surface structure will also create an output beam in the shape of a ring or doughnut, with no light in the center. This is essentially similar to a vortex phase plate, which is commercially available and which is illustrated in FIG. 6.

In another embodiment, the facet of a multi-mode chalcogenide, fluoride, silica, silicate, germanate, tellurite or any other optical fiber is modified such that a certain binary phase difference can be achieved in a controlled manner across the fiber cross-section over a predefined pattern. Of great interest is the situation of low-mode number fibers where phase change can be used as a modal filter.

EXAMPLE 5

Figure 7:
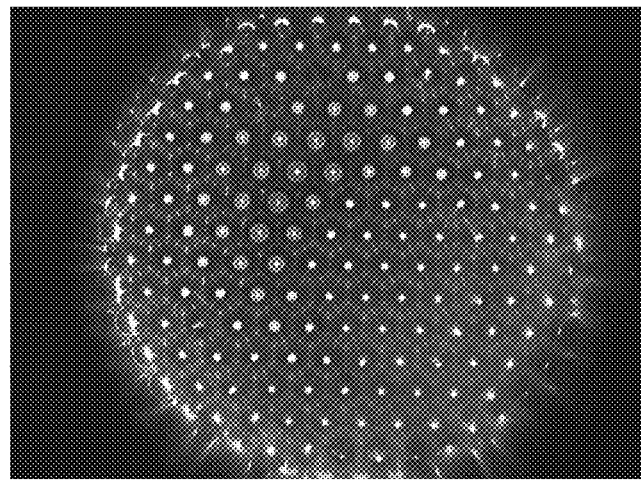
FIG. 7 is an example of a multi-mode chalcogenide fiber stamped with a 2D pattern.

A multimode $As_2S_3$ fiber has been stamped with a macroscopic 2D array of holes and imaged in reflection mode with white light as shown in FIG. 7.

In another embodiment, the facet of a multi-mode chalcogenide, fluoride, silica, silicate, germanate, tellurite or any other optical fiber is modified such that a certain complex (non binary) phase difference can be achieved in a controlled manner across the fiber cross-section over a predefined pattern. Of interest is the situation of low-mode number fibers where phase change can be used as a modal filter.

In another embodiment, the facet of a solid-core photonic crystal fiber is modified such that a certain binary phase difference can be achieved in a controlled manner across the fiber cross-section over a predefined pattern. The photonic crystal fiber can be made of chalcogenide, fluoride, silica, silicate, germanate, tellurite or any suitable material.

In another embodiment, the facet of a solid-core photonic crystal fiber is modified such that a certain complex (non binary) phase difference can be achieved in a controlled manner across the fiber cross-section over a predefined pattern. The photonic crystal fiber can be made of chalcogenide, fluoride, silica, silicate, germanate, tellurite or any suitable material.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method for shaping an output light beam from an optical fiber, the method comprising:
    texturing a surface of an exit facet of the optical fiber according to a texturing pattern designed to initiate a static phase difference between a first portion of the output light beam and a second portion of the output light beam such that the textured surface has a plurality of varying depths in the exit facet; and
    transmitting a light beam through the optical fiber to produce the output light beam.

2. The method of claim 1, wherein no additional material is attached to or deposited on the exit facet of the optical fiber to initiate the static phase difference.

3. The method of claim 1, wherein the texturing comprises stamping the exit facet.

4. The method of claim 1, wherein the optical fiber comprises chalcogenide, fluoride, tellurite, or any combination thereof.

5. The method of claim 1, wherein the optical fiber comprises a solid core photonic crystal fiber.

6. The method of claim 1, wherein the optical fiber is a single mode fiber.

7. The method of claim 1, wherein the optical fiber is a multi-mode fiber.

8. The method of claim 1, further comprising:
    forming a plurality of steps in a spiral pattern on the surface of the exit facet according to the texturing pattern, and wherein the output light beam is in the shape of a ring with no light in the center.

9. The method of claim 1, further comprising:
    forming a plurality of steps on the surface of the exit facet according to the texturing pattern, wherein the texturing pattern is a periodic texturing pattern.

10. The method of claim 9, wherein the texturing pattern is a texturing pattern including an array of circular symmetric lines.

11. The method of claim 9, wherein the texturing pattern is a texturing pattern including an array of non-circular symmetric lines.

12. A method for shaping an output light beam from an optical fiber, the method comprising:
    forming a first step on a surface of a first portion of an exit facet of the optical fiber according to a texturing pattern designed to initiate a static phase difference between a first portion of the output light beam and a second portion of the output light beam;
    forming a second step on the surface of a second portion of the exit facet according to the texturing pattern, wherein a first depth of the first step in the surface of the exit facet is different than a second depth of the second step in the surface of the exit facet; and
    transmitting a light beam through the optical fiber to produce the output light beam.

13. The method of claim 12, wherein the static phase difference between the first portion of the output light beam and the second portion of the output light beam is a $\pi$ phase shift.

14. The method of claim 12, wherein a difference between the first depth and the second depth is determined according to the equation $d=\lambda/(2(n-1))$, wherein n represents an effective index of the fundamental mode, wherein $\lambda$ represents an operating wavelength, and wherein d represents the difference between the first depth and the second depth.

15. A method for shaping an output light beam from an optical fiber, the method comprising:
    forming a first step on a surface of a first portion of an exit facet of the optical fiber according to a texturing pattern designed to initiate a static phase difference between a first portion of the output light beam and a second portion of the output light beam;
    forming a second step on the surface of a second portion of the exit facet according to the texturing pattern, wherein a first depth of the first step in the surface of the exit facet is different than a second depth of the second step in the surface of the exit facet; and
    transmitting a light beam with a substantially uniform phase through an entire core of the optical fiber to produce the output light beam, wherein, after passing through the exit facet, the first portion of the output light beam and the second portion of the output light beam differ in phase according to the static phase difference.

16. The method of claim 15, further comprising:
    forming a plurality of steps, including the first step and the second step, in a spiral pattern on the surface of the exit facet according to the texturing pattern, wherein the output light beam is in the shape of a ring with no light in the center.

* * * * *